Figure 4:
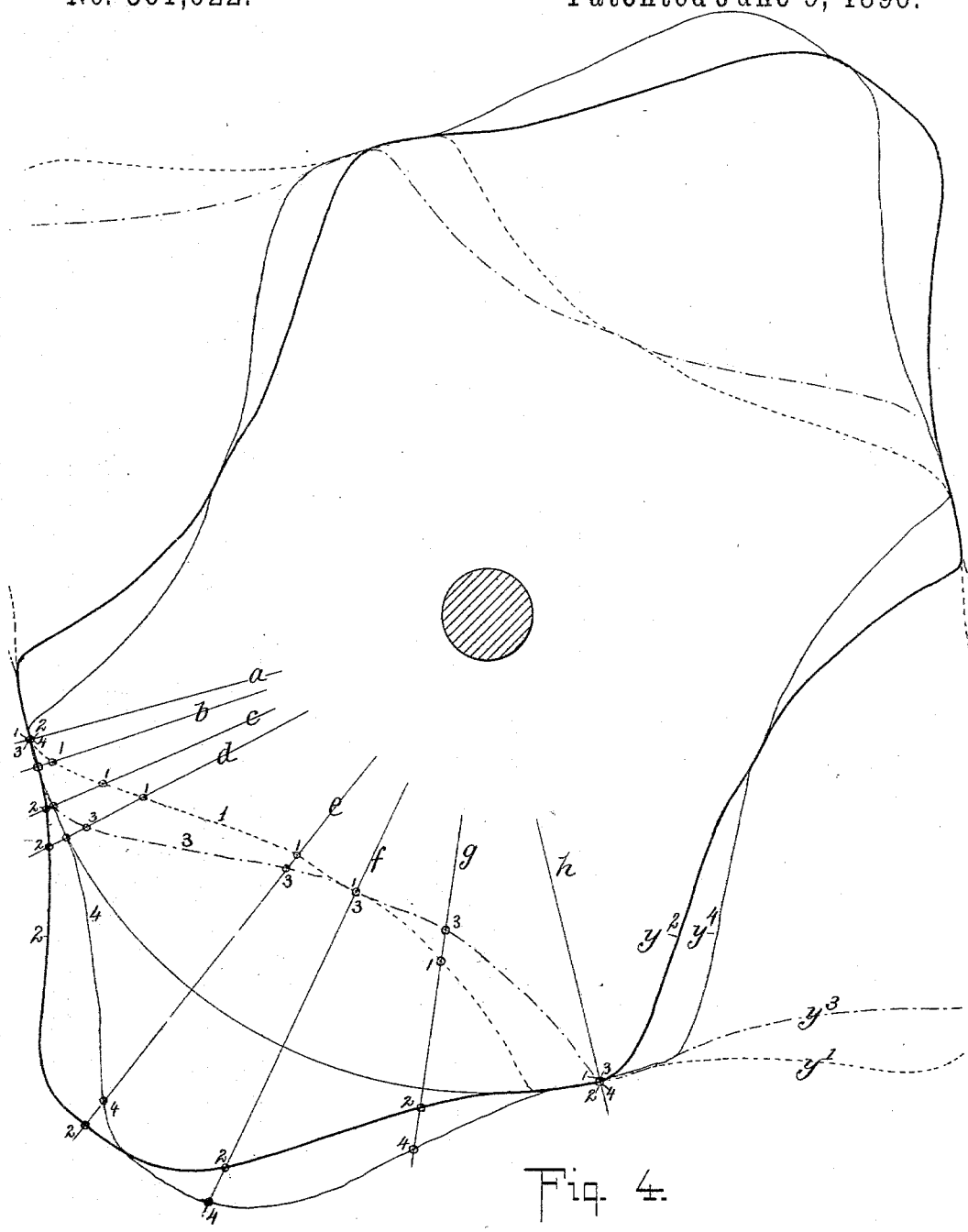

(No Model.) 5 Sheets—Sheet 1.
R. SIMON.
MEANS FOR WEAVING.
No. 561,622. Patented June 9, 1896.
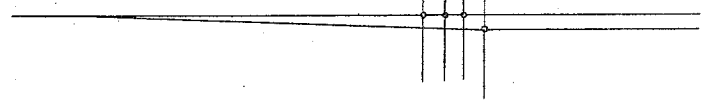
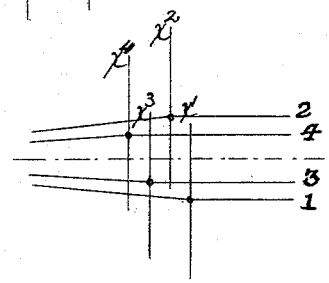
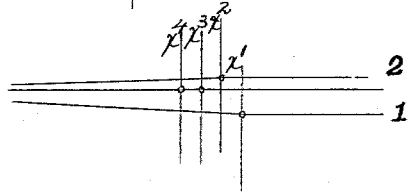
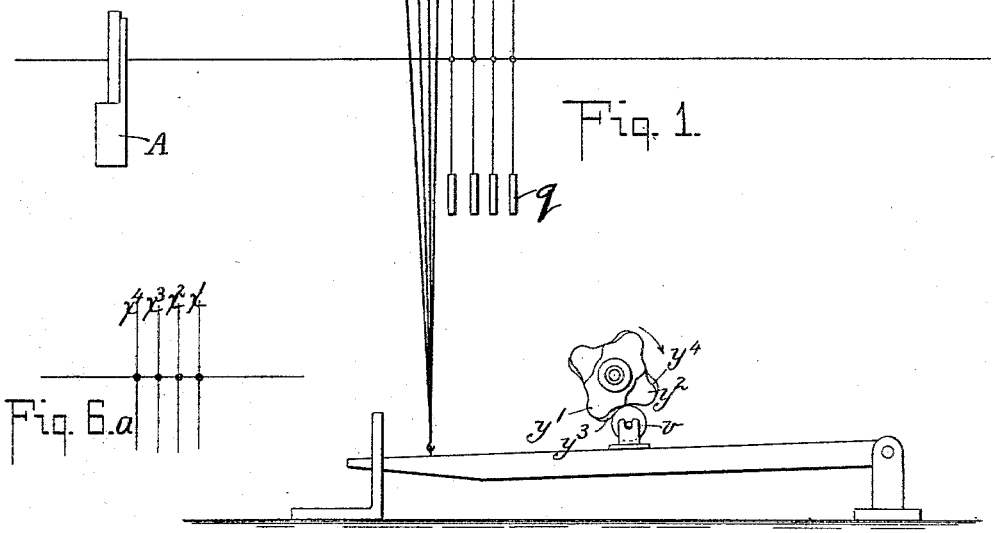
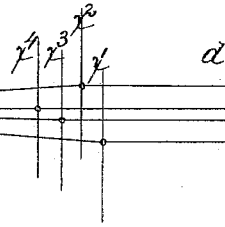
WITNESSES: INVENTOR
Robert Simon
BY Briesen & Knauth
his ATTORNEYS

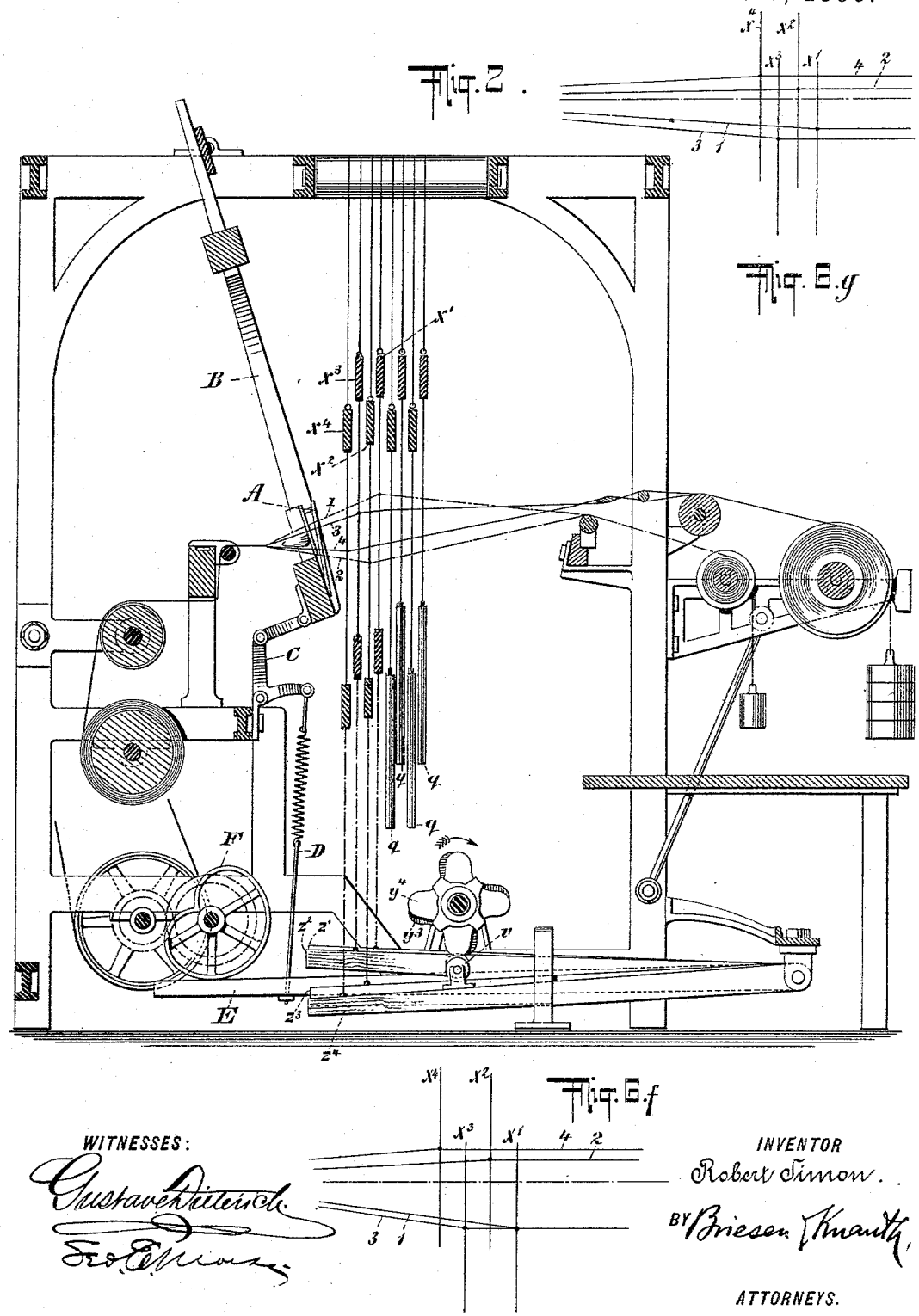

(No Model.) 5 Sheets—Sheet 3.

R. SIMON.
MEANS FOR WEAVING.

No. 561,622. Patented June 9, 1896.

Fig. 3.

WITNESSES:

INVENTOR
Robert Simon.
BY Briesen & Knauth
ATTORNEYS.

(No Model.)     R. SIMON.     5 Sheets—Sheet 4.
MEANS FOR WEAVING.
No. 561,622.     Patented June 9, 1896.

WITNESSES:
N. B. Shepherd.
Charles E. Smith

INVENTOR
Robert Simon
BY Briesen & Knauth
his ATTORNEYS (No Model.)
R. SIMON.
MEANS FOR WEAVING.
No. 561,622.    Patented June 9, 1896.
5 Sheets—Sheet 5.
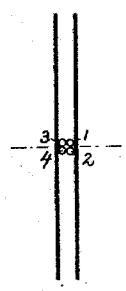
Fig. 7.a
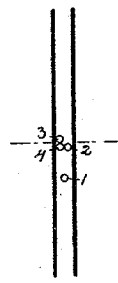
Fig. 7.b
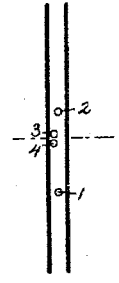
Fig. 7.c
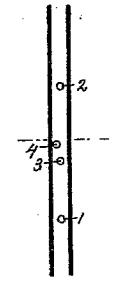
Fig. 7.d
Fig. 7.e
Fig. 7.f
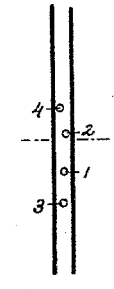
Fig. 7.g
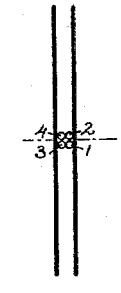
Fig. 7.h
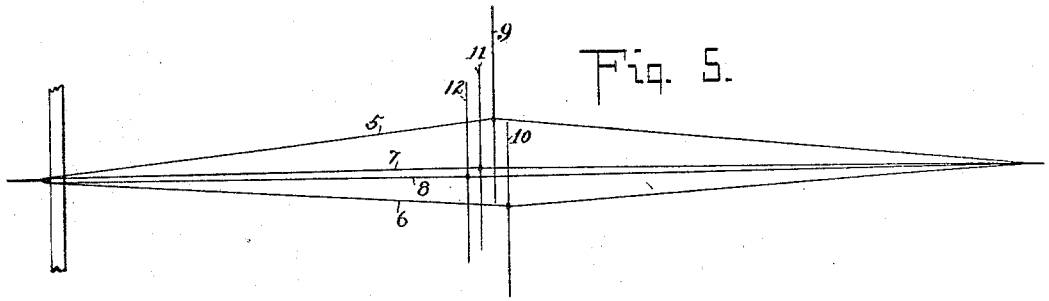
Fig. 5.
WITNESSES:
INVENTOR
Robert Simon
BY Briesen & Krautz
his ATTORNEYS

UNITED STATES PATENT OFFICE.

ROBERT SIMON, OF UNION HILL, NEW JERSEY.

MEANS FOR WEAVING.

SPECIFICATION forming part of Letters Patent No. 561,622, dated June 9, 1896.

Application filed August 21, 1894. Serial No. 520,899. (No model.)

*To all whom it may concern:*

Be it known that I, ROBERT SIMON, a citizen of the United States, residing at Union Hill, in the county of Hudson and State of New Jersey, have invented an Improved Means for Weaving, of which the following is a full, clear, and exact description.

This invention relates more particularly to silk weaving, wherein several threads are passed through a single dent in the reed; and said invention consists in an improved means for manipulating silk or analogous threads to weave, substantially as hereinafter described and claimed.

In the drawings forming part hereof, Figure 1 is a diagrammatic view of some of the operating parts of a loom embodying my improvements, the parts being in the positions which they assume when the shed is closed. Fig. 2 is a sectional side elevation of a loom embodying my invention, showing the parts in the position which they assume as the shed is opened, the shuttle-whipping mechanism being omitted, the section being taken on line 2 2 of Fig. 3. Fig. 3 is a rear elevation of the loom to clearly show the shuttle-whipping mechanism and the location of the treadles relative to their operating-cams. Fig. 4 is a diagrammatic view, partly dotted, exhibiting the cams and showing the relation of their respective working-surfaces. Fig. 5 is a diagrammatic view showing an old method of beating up to which I shall presently have reference. Figs. $6^a$, $6^b$, $6^c$, $6^d$, $6^e$, $6^f$, and $6^g$ are diagrammatic views showing the different positions of the threads in successive periods of time during the weaving operation. Figs. $7^a$, $7^b$, $7^c$, $7^d$, $7^e$, $7^f$, and $7^g$, inclusive, are diagrammatic end views of the threads represented in the preceding figures, Fig. $7^a$ corresponding to Fig. $6^a$, Fig. $7^b$ corresponding to Fig. $6^b$, and so on. Fig. $7^h$ represents in diagram the position that the threads assume after the beating up or last step in a single operation has taken place—that is, the threads are reversed in position.

In silk weaving it is customary to pass several threads from two sets of independently-moving harnesses through a single dent or interstice in the reed, and when the shed is opened and closed it causes a crossing of the warp-threads in the reed, crowding the threads therein and rendering the threads liable to breakage. This proceeding, however, is also objectionable for the further reason that when the beating up takes place, the threads being at different angles, they will be subjected to different degrees of strain, greater strain than would otherwise be necessary being exerted upon the uppermost and lowermost threads, often causing the breaking thereof, when it would be necessary to stop the loom and repair the broken threads. This will be clearly evident from an inspection of Fig. 5, wherein 9, 10, 11, and 12 represent heddles carrying threads 5, 6, 7, and 8. Supposing the threads to be in the position shown—that is to say, making different angles with a horizontal plane—when the beating up occurs, certain of the threads will be subjected to greater strain than others and will be in danger of being broken. It will be readily understood that this breaking of the threads causes the loss of much time and the production of many imperfections in the finished fabric.

The object of my invention is to overcome difficulties existent in looms heretofore devised, which object I accomplish by providing my loom with three or more independently-moving harnesses and actuating the same by staggered cams or their equivalents arranged in such a manner as to move warp-threads successively from their closed to their open shed position and successively from their open to their closed shed position—*i. e.*, into substantially the same plane—at the time of beating up. And right here I pause to remark that as the threads move successively in the dent in the reed and not together in a bunch, as above outlined when speaking of old methods, there will be no crowding of the threads as they pass each other, and consequently little or no breakage or wear, and as a further consequence more threads can safely be manipulated in a single dent.

Referring particularly to Figs. 1 and 2 of the drawings, A designates a reed through a single dent or interstice of which pass a number of threads. I have chosen in the present instance to show but a single dent and four threads passing through the dent; but it will be understood that this is merely done for the purpose of illustration, as the loom may be threaded in any ordinary manner. These threads 1, 2, 3, and 4 are carried by mails $x'$, $x^2$, $x^3$, and $x^4$, thread 1 being carried by mail $x'$, thread 2 being carried by mail $x^2$, and so on. Treadles $z'$, $z^2$, $z^3$, and $z^4$ are connected to the harness in any usual manner. Coöperating with these treadles is a series of staggered arms $y'$, $y^2$, $y^3$, and $y^4$, cam $y'$ (see Fig. 4) coöperating with treadle $z'$, cam $y^2$ coöperating with treadle $z^2$, and so on throughout the series constituting the combination. As the cams rotate they are caused to act upon the treadles to open and allow of the closing of the shed, as will be now described, it being understood that there are suitable means, such as counterweights $q$, as is common in looms, to move the harnesses in an opposite direction from which they are moved by the cams of the treadle. These cams are shaped according to the number of picks that are to be had during a revolution of the cam-shaft. In the present instance they are (for the purpose of illustration) shown as four-pick cams of the shape shown in full black lines in Fig. 4 and are staggered upon their shaft—that is to say, so as to act upon their harnesses successively.

Referring particularly to Fig. 6$^a$, it will be noticed that the shed is closed and the mails carrying the threads are all in the same horizontal plane. At this stage of the operation the rollers $v$ on the treadles are in contact with all the cams at the point where the line $a$ (see Fig. 4) cuts the working surfaces of the staggered cams, or, in other words, portions of the working surfaces of all the various cams register at given points, as at $a$, when the shed is closed. As the cams continue to revolve and the roller of the treadle $z'$ passes from the end of the line $a$ to the end of the line $b$ upon the cam $y'$ the thread 1, actuated thereby, will begin to move before the others, it being shown in this case as moving down. This new position of the thread 1 is exhibited in diagram in Fig. 6$^b$ and in section in Fig. 7$^b$. As the cams continue to revolve the thread 1 will continue its motion from the closed-shed position and thread 2 will begin to move, so that when the cams have turned so that the point on the surfaces where the line $c$ cuts them comes against the rollers $v$ of the treadles the threads will be in the positions shown in diagram in Fig. 6$^c$ and in section in Fig. 7$^c$, and so on as the cams revolve and one after another of the treadles is operated the threads will successively assume the positions shown in diagram in Figs. 6$^d$, 6$^e$, 6$^f$, and 6$^g$, and in section in Figs. 7$^d$, 7$^e$, 7$^f$, and 7$^g$, the threads returning from their open-shed positions to their closed-shed positions successively, the threads arriving in the plane of the closed shed successively, and resting in this position until all of the threads have arrived in the closed-shed position, when the beating up will occur. This beating up may be effected by the ordinary batten B, (see Fig. 2,) operated in any suitable manner, as by the elbow-lever C, link D, treadle E, and cam F, run from the main cam-shaft. It will be understood that when the shed is open (see Fig. 2) the weft-thread is passed therethrough, which operation may be effected in any desired manner, whips G, operated from the cams H and spring-joint I, being shown for this purpose. When in the open-shed position, the upper set of threads are all in substantially the same plane, and the lower set also in substantially the same plane. When the shed is closed, all the threads are in substantially the same plane, so that if the beating up occur while the threads are in this position the strain upon individual threads will be the same.

It will be observed upon reference to Fig. 7$^h$ that at the end of the movement the positions of the threads in a dent are reversed—that is to say, threads 2 and 4, which were formerly lowermost, (see Fig. 7$^a$,) have now become uppermost and threads 1 and 3 have become lowermost. This is of course due to the fact that the threads have been crossed, and when the beating up of the weft-thread occurs the lower threads of the shed become the upper threads.

It will be understood that I do not limit myself to the mechanism described, nor do I wish to have it understood that I limit myself to four threads in a dent or any particular number of threads, and although I have shown certain arrangements in a loom I do not wish to have it undestood that I thereby limit myself to apparatus thus organized, as many changes may be made in the arrangement should it be found advantageous to do so. I am aware that it is not new to open and close the shed by successively moving individual threads, so, therefore, I would have it understood that I do not broadly claim such mode of operation; but What I do claim, and desire to secure by Letters Patent, is—

The herein-described means for weaving, the same comprising warp-thread manipulating means for opening and closing the shed by successively moving threads of the warp from their closed-shed positions to their open-shed position and vice versa, and for maintaining the threads first to arrive in the closed-shed position in such closed-shed position until the threads last to arrive in the closed-shed position have arrived in such position and for maintaining the shed closed while beating up the weft-thread, combined with means for passing the weft-thread through the shed while the same is open, and means for beating up the weft-thread while the shed is closed, as specified.

ROBERT SIMON.

Witnesses:
E. WHILLDIN,
CHAS. W. MULLER.